(12) United States Patent
Shinn et al.

(10) Patent No.: US 8,854,722 B2
(45) Date of Patent: Oct. 7, 2014

(54) COLOR ELECTRONIC PAPER APPARATUS, DISPLAY AND MANUFACTURING METHOD THEREOF

(75) Inventors: Ted-Hong Shinn, Hsinchu (TW); Fang-An Shu, Hsinchu (TW); Yao-Chou Tsai, Hsinchu (TW); Wen-Chung Tang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 13/360,800

(22) Filed: Jan. 29, 2012

(65) Prior Publication Data
US 2012/0320446 A1    Dec. 20, 2012

(30) Foreign Application Priority Data

Jun. 20, 2011 (TW) .............................. 100121443 A

(51) Int. Cl.
*G02B 26/00* (2006.01)
*G02F 1/167* (2006.01)
*G02F 1/1335* (2006.01)

(52) U.S. Cl.
CPC .................................... *G02F 1/167* (2013.01); *G02F 1/133514* (2013.01)
USPC ........................................................ 359/296

(58) Field of Classification Search
CPC ............................ G02F 1/133514; G02F 1/167
USPC .................................................. 359/290–296
See application file for complete search history.

(56) References Cited

U.S. PATENT DOCUMENTS

| | | | |
|---|---|---|---|
| 6,087,769 A * | 7/2000 | Aben et al. ..................... | 313/479 |
| 2003/0107797 A1* | 6/2003 | Saxe .............................. | 359/296 |
| 2005/0105159 A1* | 5/2005 | Paolini et al. ................. | 359/252 |
| 2005/0266590 A1 | 12/2005 | Roh et al. | |
| 2010/0177397 A1* | 7/2010 | Kamiyama et al. ........... | 359/609 |
| 2011/0315989 A1* | 12/2011 | Shu et al. ....................... | 257/59 |

FOREIGN PATENT DOCUMENTS

| | | |
|---|---|---|
| CN | 101012343 A | 8/2007 |
| CN | 103091894 A | 5/2013 |
| JP | S6385720 A | 4/1988 |
| JP | 2009271147 A | 11/2009 |
| JP | 2010139548 A | 6/2010 |
| TW | 200720086 | 6/2007 |
| TW | 201041432 A | 11/2010 |

* cited by examiner

*Primary Examiner* — Thomas K Pham
*Assistant Examiner* — Vipin Patel
(74) *Attorney, Agent, or Firm* — CKC & Partners Co., Ltd.

(57) ABSTRACT

A color electronic paper apparatus includes a display layer, a color resist layer, an anti-ultraviolet layer and a protective sheet. The color resist layer is disposed on the display layer. The anti-ultraviolet layer is disposed on the color resist layer. The protective sheet is disposed on the anti-ultraviolet layer. A manufacturing method of the color electronic paper apparatus and a color electronic paper display are provided herein.

13 Claims, 3 Drawing Sheets

COLOR ELECTRONIC PAPER APPARATUS, DISPLAY AND MANUFACTURING METHOD THEREOF

RELATED APPLICATIONS

This application claims priority to Taiwan Application Serial Number 100121443, filed Jun. 20, 2011, which is herein incorporated by reference.

BACKGROUND

1. Technical Field

The present disclosure relates to an electronic apparatus and a manufacturing method thereof, and more particularly, to a color electronic paper apparatus, a color electronic paper display and a manufacturing method of the color electronic paper apparatus.

2. Description of Related Art

With the rapid development of current display technologies, various portable display apparatuses are widely applied in daily life, for example, a panel computer, an e-book and a digital picture frame. In the portable display apparatuses, color electronic paper apparatus characterized by flexibility, power saving and convenience draws the most attention.

A manufacturing method of the typical color electronic paper apparatus is mainly to dispose a color resist layer on a display layer, so as to convert a black-and-white image originally outputted by the display layer into a color image output through the color resist layer. However, chroma of a color photo-resist of the color resist layer is easily changed due to influence of heat or ultraviolet irradiation, and thus color display quality of the color electronic paper apparatus deteriorates.

Therefore, in the typical color electronic paper apparatus, the problem of the color display quality still needs to be solved.

SUMMARY

The present disclosure discloses a color electronic paper apparatus, a color electronic paper display and a manufacturing method of the color electronic paper apparatus for improve the color display quality of the color electronic paper.

In one aspect, an embodiment of the present disclosure provides a color electronic paper apparatus including a display layer, a color resist layer, an anti-ultraviolet layer and a protective sheet. The color resist layer is disposed on the display layer. The anti-ultraviolet layer is disposed on the color resist layer. The protective sheet is disposed on the anti-ultraviolet layer.

In another aspect, an embodiment of the present disclosure provides a manufacturing method of the color electronic paper apparatus, which includes the following steps. A color resist layer is formed on a display layer. An anti-ultraviolet layer is formed on the color resist layer. A protective sheet is disposed on the anti-ultraviolet layer.

In still another aspect, an embodiment of the present disclosure provides a color electronic paper display including a thin film transistor array substrate, a display layer, a color resist layer, an anti-ultraviolet layer, and a protective sheet. The display layer is disposed on the thin film transistor array substrate. The color resist layer is disposed on the display layer. The anti-ultraviolet layer is disposed on the color resist layer. The protective sheet is disposed on the anti-ultraviolet layer.

Therefore, through the present disclosure, the anti-ultraviolet layer is disposed on the color resist layer, so as to prevent ultraviolet and heat from affecting the chroma of the color resist layer, and improve color display quality of the color electronic paper.

BRIEF DESCRIPTION OF THE DRAWINGS

In order to make the aforementioned and other objectives, features, advantages and embodiments of the present disclosure more comprehensible, the accompanying drawings are illustrated as follows.

DETAILED DESCRIPTION

The spirit of the present disclosure is illustrated clearly below with reference to drawings and detailed description, persons having ordinary skill in the art, after understanding exemplary embodiments of the present disclosure, may make changes and modifications through technologies taught in the present disclosure, and the changes and modifications do not depart from the spirit and the scope of the present disclosure.

The term "almost", "about" or "approximately" used in the present disclosure generally refers to that a deviation or a range of a numeric value is within 20%, preferably within 10%, more preferably within 5%. If there is no specific explanation, the numeric values mentioned in the present disclosure are all considered as approximations, which are similar to the deviation or range represented by the term "almost", "about" or "approximately".

Figure 1:
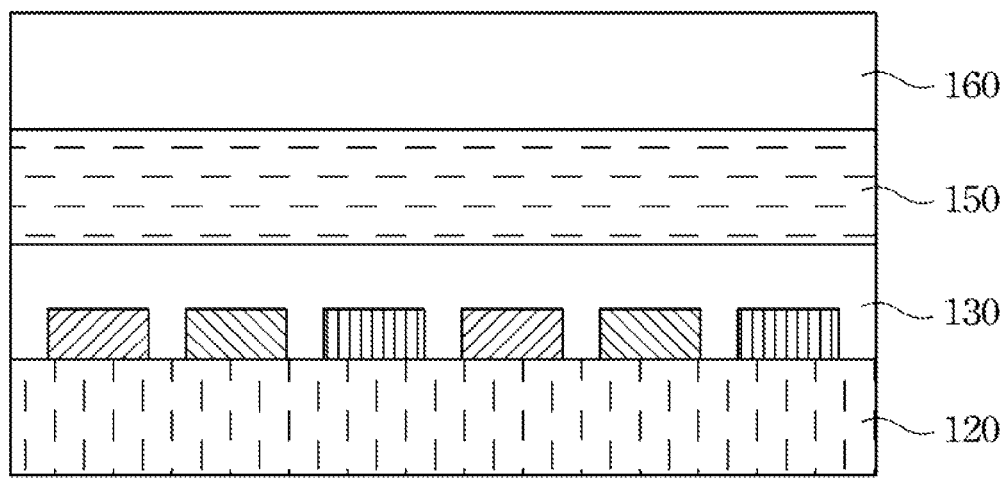
FIG. 1 is a schematic structural view of a color electronic paper apparatus according to an embodiment of the present disclosure.

Referring to FIG. 1, FIG. 1 is a schematic structural view of a color electronic paper apparatus 100 according to an embodiment of the present disclosure. The color electronic paper apparatus 100 includes a display layer 120, a color resist layer 130, an anti-ultraviolet layer 150, and a protective sheet 160. The color resist layer 130 is disposed on the display layer 120. The anti-ultraviolet layer 150 is disposed on the color resist layer 130. The protective sheet 160 is disposed on the anti-ultraviolet layer 150.

In an embodiment, no protective layer exists between the color resist layer 130 and the anti-ultraviolet layer 150.

For example, according to different types of the color electronic paper apparatus 100, the display layer 120 may be an electrophoresis display layer, a cholesterol liquid crystal display layer or an Organic Light-Emitted Diode (OLED) display layer. Taking the electrophoresis display layer as an example, the display layer 120 may include a Front Panel Laminate (FPL) and a plurality of microcapsules, and the microcapsules can be enabled to demonstrate a black, white and multi-gray-scale image by changing an electric field.

The color resist layer 130 may be formed on the display layer 120 through an ink-jet manner, a printing manner or a photo-lithography process. The color resist layer 130 may include a plurality of red photo-resists, a plurality of blue photo-resists, and a plurality of green photo-resists, so as to filter white light and convert the white light into red light, blue light and green light for outputting, so that the image generated by the display layer 120 may demonstrate multiple colors after passing through the color resist layer 130.

The anti-ultraviolet layer 150 is disposed on the color resist layer 130, so as to block ultraviolet with an optical wavelength lower than 400 nm to prevent the color resist layer 130 from generating chroma change due to ultraviolet irradiation. In this embodiment, the anti-ultraviolet layer 150 is directly formed on the color resist layer 130, and therefore, no protective layer exists between the color resist layer 130 and the anti-ultraviolet layer 150.

The protective sheet 160 is disposed on the anti-ultraviolet layer 150, so as to protect the anti-ultraviolet layer 150, and a structure formed from the display layer 120, the color resist layer 130 and the anti-ultraviolet layer 150 jointly. A material of the protective sheet 160 may be Polyethylene Terephthalate (PET).

Figure 2:
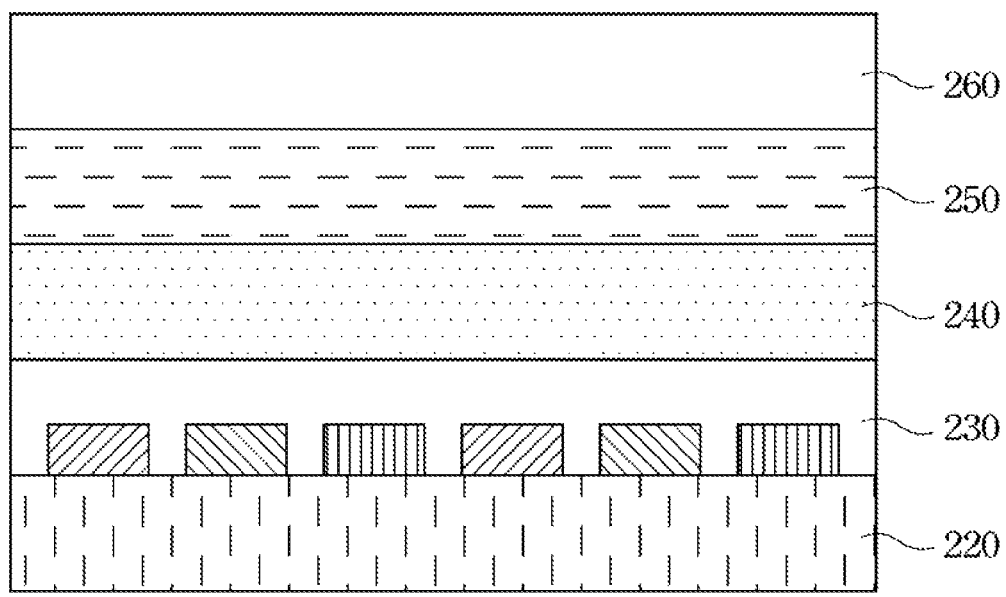
FIG. 2 is a schematic structural view of a color electronic paper apparatus according to an embodiment of the present disclosure.

Referring to FIG. 2, FIG. 2 is a schematic structural view of a color electronic paper apparatus 200 according to an embodiment of the present disclosure. The structural configuration of the color electronic paper apparatus 200 is the same as or similar to that in FIG. 1, which is not described herein again.

In an embodiment of the embodiment, the color electronic paper apparatus 200 further includes a protective layer 240 disposed between a color resist layer 230 and an anti-ultraviolet layer 250.

For example, the protective layer 240 is disposed between the color resist layer 230 and the anti-ultraviolet layer 250, so as to prevent a chemical material in the color resist layer 230 from being affected by a material of the anti-ultraviolet layer 250.

Referring to FIG. 1 and FIG. 2, in an the embodiment, the anti-ultraviolet layer 150 or 250 is formed from at least one of a plurality of titanium dioxide particles and a resin material. In an embodiment, the titanium dioxide particles have a particle diameter of about 20 nm-50 nm. In an embodiment, the composition of the titanium dioxide particles is about 0.1%-10% in the anti-ultraviolet layer 150 or 250. In an embodiment, the resin material includes at least one of acrylic resin, silicone resin, and polyvinyl butyral (PVB). In an embodiment, a thickness of the anti-ultraviolet layer 150 or 250 is about 1 μm-30 μm.

For example, the anti-ultraviolet layer 150 or 250 may be a colloid or solid, and may be formed from the titanium dioxide particles, the resin material or a mixture of the titanium dioxide particles and the resin material. The titanium dioxide particles have a particle diameter of about 20 nm-50 nm, so as to obtain a preferable anti-ultraviolet effect. In addition, the composition of the titanium dioxide particles is about 0.1%-10% in the anti-ultraviolet layer 150 or 250. The resin material may be at least one of acrylic resin, silicone resin, and PVB, so as to obtain a preferable light transmittance and a preferable anti-ultraviolet effect. Moreover, a thickness of the anti-ultraviolet layer 150 or 250 may be from about 1 μm to 30 μm, so as to meet the requirements in an actual application or a manufacturing process. It should be noted that, the anti-ultraviolet layer 150 or 250 may be further made into a form of a double-sided adhesive, to conveniently adhere the anti-ultraviolet layer 150 or 250 under the protective sheet 160 or 260, and then the protective sheet 160 or 260 is adhered on and covers the color resist layer 130 or the protective layer 240 for simplifying a manufacturing process and saving manufacturing cost. The anti-ultraviolet layer 150 or 250 may also be formed through a manner of printing or coating, and is not limited to the above embodiment.

Figure 3:
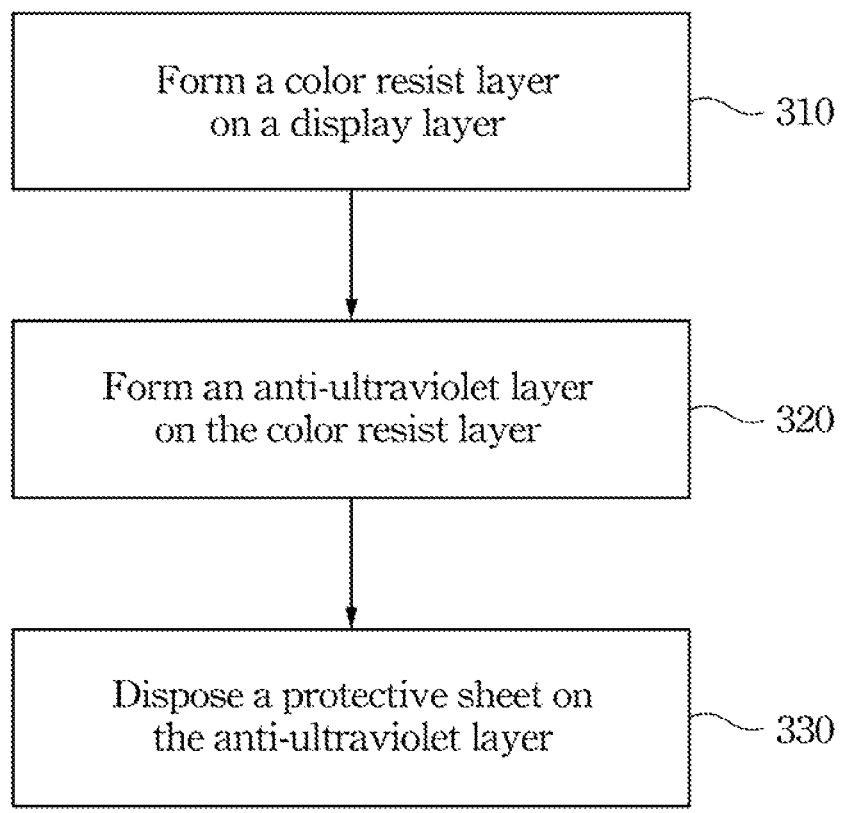
FIG. 3 is a schematic flow chart showing a manufacturing method of a color electronic paper apparatus according to an embodiment of the present disclosure.

Referring to FIG. 3, FIG. 3 is a schematic flow chart showing a manufacturing method of the color electronic paper apparatus according to an embodiment of the present disclosure.

In step 310, a color resist layer is formed on a display layer. For example, the color resist layer may be formed on the display layer through an ink-jet manner, a printing manner or a photo-lithography process. The color resist layer may include a plurality of red photo-resists, a plurality of blue photo-resists, and a plurality of green photo-resists, so as to filter white light and convert the white light into red light, blue light and green light for outputting, so that the image generated by the display layer may demonstrate multiple colors after passing through the color resist layer.

In step 320, an anti-ultraviolet layer is formed on the color resist layer. For example, the anti-ultraviolet layer may be formed on the color resist layer by attaching, printing or coating, so as to block ultraviolet with an optical wavelength lower than 400 nm to prevent the color resist layer from generating chroma change due to ultraviolet irradiation.

In step 330, a protective sheet is disposed on the anti-ultraviolet layer. For example, the protective sheet is disposed on the anti-ultraviolet layer to protect the anti-ultraviolet layer and a structure commonly formed from the display layer, the color resist layer and the anti-ultraviolet layer.

In addition, a protective layer may be further formed between the color resist layer and the anti-ultraviolet layer by attaching or coating a thin film, thereby preventing a chemical material in the color resist layer from being affected by a material of the anti-ultraviolet layer.

Figure 4:
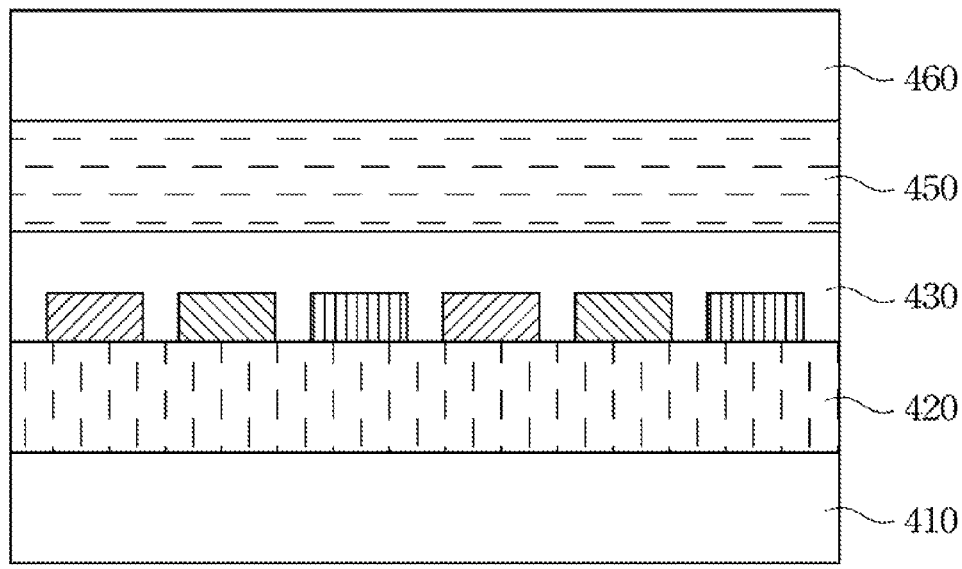
FIG. 4 is a schematic structural view of a color electronic paper display according to an embodiment of the present disclosure.

Referring to FIG. 1 and FIG. 4, FIG. 4 is a schematic structural view of a color electronic paper display 400 according to an embodiment of the present disclosure. The color electronic paper display 400 includes a thin film transistor array substrate 410, a display layer 420, a color resist layer 430, an anti-ultraviolet layer 450, and a protective sheet 460. The display layer 420 is disposed on the thin film transistor array substrate 410. The color resist layer 430 is disposed on the display layer 420. The anti-ultraviolet layer 450 is disposed on the color resist layer 430. The protective sheet 460 is disposed on the anti-ultraviolet layer 450.

In this embodiment, the thin film transistor array substrate 410 is disposed under the display layer 420, and the movements of charged particles in a microcapsule are controlled by changing an electric field between a pixel electrode of the thin film transistor array substrate 410 and the display layer 420, thereby enabling an image picture to be demonstrated. It should be noted that, other structural arrangements of the color electronic paper display 400 in this embodiment are the same as or similar to those in FIG. 1, and thus are not described herein again.

In an embodiment of the embodiment, the anti-ultraviolet layer 450 is directly formed on the color resist layer 430, and therefore, no protective layer exists between the color resist layer 430 and the anti-ultraviolet layer 450.

Figure 5:
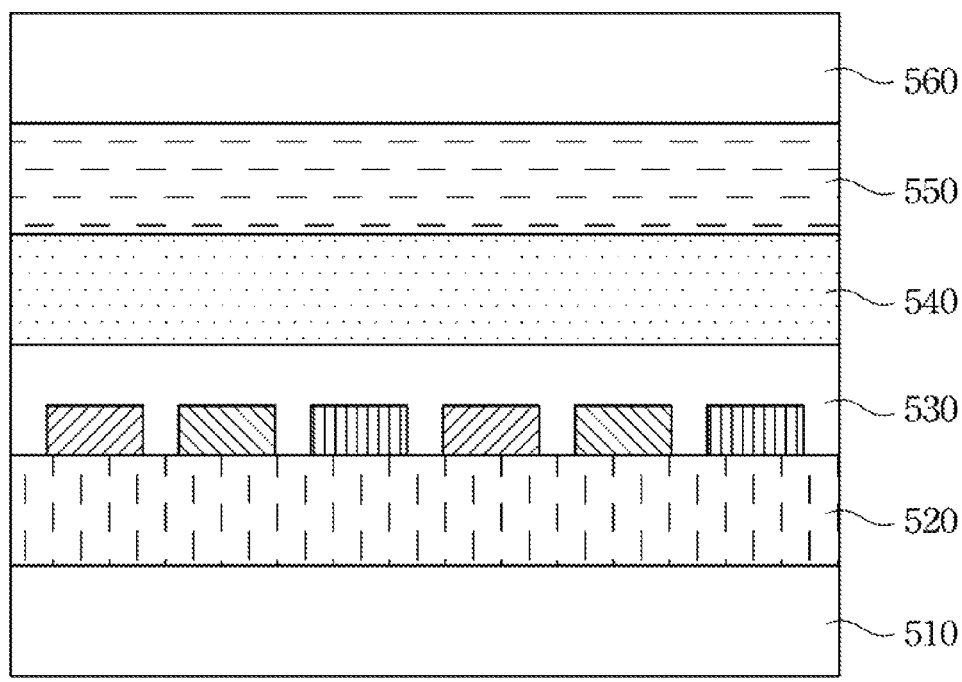
FIG. 5 is a schematic structural view of a color electronic paper display according to an embodiment of the present disclosure.

Referring to FIG. 4 and FIG. 5, FIG. 5 is a schematic structural view of a color electronic paper display 500 according to an embodiment of the present disclosure. In this embodiment, the structure configuration of the color electronic paper display 500 is the same as or similar to that in FIG. 4, which is not described herein again.

In an embodiment of the embodiment, the color electronic paper display 500 further includes a protective layer 540 disposed between a color resist layer 530 and an anti-ultraviolet layer 550.

For example, the protective layer 540 is disposed between the color resist layer 530 and the anti-ultraviolet layer 550, so as to prevent a chemical material in the color resist layer 530 from being affected by a material of the anti-ultraviolet layer 550.

Referring to FIG. 4 and FIG. 5, in an embodiment, the anti-ultraviolet layer 450 or 550 is formed from at least one of titanium dioxide particles and a resin material. In an embodiment, the titanium dioxide particles have a particle diameter of about 20 nm-50 nm. In an embodiment, the composition of the titanium dioxide particles is about 0.1%-10% in the anti-ultraviolet layer 450/550. In an embodiment, the resin material includes at least one of acrylic resin, silicone resin, and PVB. In an embodiment, a thickness of the anti-ultraviolet layer 450/550 is about 1 μm-30 μm. It should be noted that, in this embodiment, a forming manner and the material of the anti-ultraviolet layer are the same as or similar to those in the embodiments corresponding to FIG. 1 and FIG. 2, which are not described herein again.

Generally, no anti-ultraviolet layer exists on the color resist layer of a conventional color electronic paper apparatus and the color resist layer of a conventional color electronic paper display, and therefore, when the color resist layer is affected by the ultraviolet irradiation or heat, the chroma of the color resist layer may be changed accordingly, so that the color display quality of the color electronic paper apparatus deteriorates.

Compared to the above method, in the embodiment of the present disclosure, the anti-ultraviolet layer is disposed on the color resist layer to prevent the ultraviolet from affecting the chroma of the color resist layer. The anti-ultraviolet layer may be in a form of a double-sided adhesive, and is adhered between the protective sheet and the color resist layer, so as to simplify a manufacturing process of the color electronic paper.

To sum up, through the present disclosure, the anti-ultraviolet layer is disposed on the color resist layer to improve the color display quality of the color electronic paper, and the present disclosure may be widely applied to a soft or rigid color electronic paper apparatus or a display thereof.

Although the present disclosure is disclosed with reference to embodiments above, the embodiments are not intended to limit the present disclosure. Various variations and modifications can be made by persons skilled in the art without departing from the spirit and the scope of the present disclosure, so the protection scope of the present disclosure should be subject to what is defined in appended claims.

What is claimed is:

1. A color electronic paper apparatus, comprising:
a display layer comprising an electrophoresis layer;
a color resist layer disposed over the display layer;
an anti-ultraviolet layer for shielding the color resist layer from ultraviolet radiation; and
a protective sheet disposed on the anti-ultraviolet layer, wherein the protective sheet forms an outermost surface layer of the color electronic paper apparatus, and the anti-ultraviolet layer is interposed between and in contact with the color resist layer and the protective sheet.

2. The color electronic paper apparatus of claim 1, further comprising:
a protective layer disposed between the color resist layer and the anti-ultraviolet layer.

3. The color electronic paper apparatus of claim 1, wherein the anti-ultraviolet layer comprises a resin material and a plurality of titanium dioxide particles dispersed therein.

4. The color electronic paper apparatus of claim 3, wherein the titanium dioxide particles have a particle diameter of substantially 20 nm-50 nm.

5. The color electronic paper apparatus of claim 3, wherein the composition of the titanium dioxide particles in the anti-ultraviolet layer is substantially 0.1%-10%.

6. The color electronic paper apparatus of claim 3, wherein the resin material comprises at least one of acrylic resin, silicone resin, and polyvinyl butyral (PVB).

7. The color electronic paper apparatus of claim 1, wherein a thickness of the anti-ultraviolet layer is substantially 1 μm-30 μm.

8. A manufacturing method of a color electronic paper apparatus, comprising the steps in sequence of:
forming a color resist layer on a display layer comprising an electrophoresis layer;
forming an anti-ultraviolet layer on the color resist layer; and
disposing a protective sheet on the anti-ultraviolet layer, wherein the protective sheet forms an outermost surface layer of the color electronic paper apparatus, and the anti-ultraviolet layer is interposed between and in contact with the color resist layer and the protective sheet.

9. A color electronic paper display, comprising:
a thin film transistor array substrate;
a display layer comprising an electrophoresis layer and disposed on the thin film transistor array substrate;
a color resist layer disposed on the display layer;
an anti-ultraviolet layer disposed on the color resist layer for shielding the color resist layer from ultraviolet radiation; and
a protective sheet disposed on the anti-ultraviolet layer, wherein the protective sheet forms an outermost surface layer of the color electronic paper apparatus, and the anti-ultraviolet layer is interposed between and in contact with the color resist layer and the protective sheet.

10. The color electronic paper display of claim 9, further comprising:
a protective layer disposed between the color resist layer and the anti-ultraviolet layer.

11. The color electronic paper display of claim 9, wherein the anti-ultraviolet layer comprises a resin material and a plurality of titanium dioxide particles dispersed therein.

12. The color electronic paper display of claim 11, wherein the composition of the titanium dioxide particles is substantially 0.1%-10% in the anti-ultraviolet layer, the titanium dioxide particles have a particle diameter of substantially 20 nm-50 am, and a thickness of the anti-ultraviolet layer is substantially 1 μm-30 μm.

13. The color electronic paper display of claim 11, wherein the resin material comprises at least one of acrylic resin, silicone resin, and polyvinyl butyral (PVB).

* * * * *